(12) United States Patent
Tan

(10) Patent No.: US 7,125,021 B2
(45) Date of Patent: Oct. 24, 2006

(54) SELF-LOCKING DRILL CHUCK

(75) Inventor: Xingda Tan, Wendeng (CN)

(73) Assignee: Shandong Weida Machinery Co., Ltd., Wendeng (CN)

( * ) Notice: Subject to any disclaimer, the term of this patent is extended or adjusted under 35 U.S.C. 154(b) by 332 days.

(21) Appl. No.: 10/650,914

(22) Filed: Aug. 29, 2003

(65) Prior Publication Data
US 2005/0258605 A1    Nov. 24, 2005

(30) Foreign Application Priority Data
Nov. 25, 2002    (CN) ............................... 02 2 55628

(51) Int. Cl.
*B23B 31/16* (2006.01)
(52) U.S. Cl. .................... 279/62; 279/902; 279/140
(58) Field of Classification Search .............. 279/62, 279/60, 61, 902, 140
See application file for complete search history.

(56) References Cited
U.S. PATENT DOCUMENTS

| | | | |
|---|---|---|---|
| 5,741,016 A * | 4/1998 | Barton et al. | 279/62 |
| 6,517,088 B1 * | 2/2003 | Rohm | 279/62 |
| 6,581,942 B1 * | 6/2003 | Rohm | 279/62 |
| 6,848,691 B1 * | 2/2005 | Yang et al. | 279/62 |
| 6,889,986 B1 * | 5/2005 | Rohm | 279/62 |
| 6,902,172 B1 * | 6/2005 | Rohm | 279/62 |
| 2002/0149159 A1 * | 10/2002 | Fan-Chiang et al. | 279/62 |
| 2003/0042692 A1 * | 3/2003 | Sakamaki et al. | 279/62 |

* cited by examiner

*Primary Examiner*—Monica Carter
*Assistant Examiner*—J Williams
(74) *Attorney, Agent, or Firm*—Birch, Stewart, Kolasch & Birch, LLP

(57) ABSTRACT

A self-locking drill chuck device includes a body, a nut, jaws, a front sleeve, a rear sleeve, a nut jacket and a rolling member. Three jaws are respectively and operatively inserted into three angled bores uniformly distributed around the body, the threads of the nut engages with that of the jaws to form a thread driving mechanism. A ratchet wheel is fixedly mounted at a rear portion of the body, a disk spring is provided between the rolling member and a load carrying shoulder of the body, the front portion of the body has key slots and an annular connecting groove, the rear end of the nut jacket has a plurality of driving grooves and keys on which a locking elastic element and a driving elastic element are respectively fixed. The drill chuck has a simple structure, convenience of operation and high working stability and reliability of self-locking capacity.

6 Claims, 9 Drawing Sheets

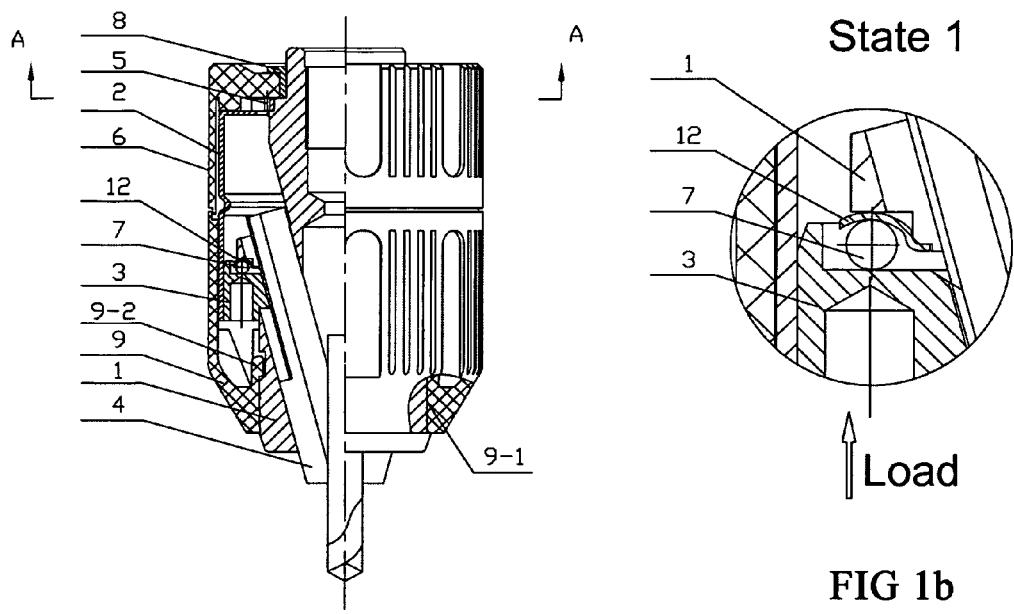
FIG 1a
FIG 1b
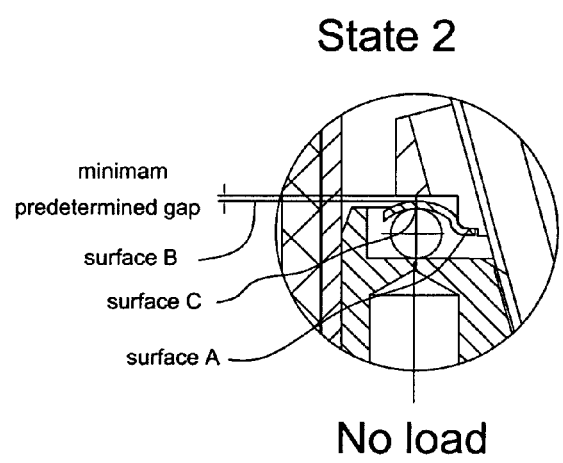
FIG 1c

SELF-LOCKING DRILL CHUCK

CROSS REFERENCE TO RELATED APPLICATIONS

This nonprovisional application claims priority under 35 U.S.C. § 119(a) on Patent Application No. 02255628.1 filed in China on Nov. 25, 2002, which is herein incorporated by reference.

TECHNICAL FIELD

The present invention relates to a drill chuck device, in particular, a self-locking drill chuck device.

BACKGROUND

A conventional drill chuck typically comprises a chuck body, a plurality of jaws, a nut, a nut jacket, a rolling member, a front sleeve, a rear sleeve, and a locking means. The jaws, usually three, are respectively inserted into three angled bores uniformly distributed around the chuck body of the drill chuck device. The nut is fitted in a nut groove of the chuck body. The threads of the nut and the threads of the jaws together form a thread driving mechanism to drive the jaws back and forth. The nut jacket is fixedly connected to the nut. The front sleeve is mounted around nut jacket and connected to the nut via keys. The rear sleeve is mounted around the rear end portion of the body.

The present invention relates to a kind of drill chuck device, particularly to a self-locking drill chuck device. During assembling and using a drill with a drill chuck device according to the present invention, a threaded rod of a driving shaft of a driving device of the drill is connected with a threaded hole defined in the rear end portion of the chuck body. When the driving shaft is driven to rotate, the chuck body, which is driven by the driving shaft, drives the three jaws to rotate together with a tool fastened therein, such as a drill head. When assembling the tool, the front sleeve and the rear sleeve fixedly connected with the chuck body are rotated relatively, thereby the front sleeve drives the nut to rotate. Meanwhile, the jaws threadingly engaged with the nut move forward or backward along the angled bores in the chuck body, so the handle of the tool, i.e., the toolholder of the drill head, is fastened by the jaws or released therefrom. The tools for the drill chuck device usually comprises screw driver, nut drivers, burrs, mounted grinding stone and drill head etc.

In order to increase the chucking effects and reliability of the drill chuck, various additional locking means may be selectively adopted. For example, several types of locking means for the drill chucks are respectively disclosed in PCT/CN02/00375 and PCT/CN02/0399. Although the drill chuck as described in PCT/CN02/00375 has a simple and compact structure, this type of drill chuck is mainly applied for DC type impact drill, if it is used for AC type impact drill, the locking reliability will be insufficient due to the high speed and the huge impact force. PCT/CN02/0399 disclosed a drill chuck suitable for various impact drills with good performances, however the structure of this type of drill chuck is complicated, it costs more than necessary when it is used for lower powered AC or DC impact drills.

Therefore, the conventional drill chucks have some drawbacks such as complex structure, low locking reliability due to vibration and impact and inconvenient assembling and disassembling.

DESCRIPTION

An object of the present invention is to provide a self-locking drill chuck having a simple structure, high working reliability and convenience of operation, which overcome the drawbacks of the foregoing conventional drill chucks.

To achieve the above-mentioned objects of the present invention, the present invention provides a self-locking drill chuck, which comprises a chuck body, a nut, three jaws, a front sleeve, a rear sleeve, a nut jacket and a rolling member; the three jaws are respectively and operatively inserted into three angled bores respectively defined in and equally distributed around the chuck body, the nut is threadingly engaged with the thread of the jaws inserted in the angled bores of the chuck body; the front sleeve is fixedly connected with the chuck body; wherein a ratchet wheel is fixedly mounted at a rear portion of the chuck body in one embodiment.

Additionally, a disk spring is provided between the rolling member and a load carrying shoulder of the chuck body, the front end of the body is provided with key slots and an annular connecting groove, a rear end surface of the nut jacket has a driving groove and a plurality of keys, wherein the rear end surface defines the ultimate position of the jaws backward; a locking elastic element and a driving elastic element are respectively fixed on the plurality of keys at the rear end of the nut jacket. A control ring is fixedly fitted in the rear sleeve. An internal surface of the control ring has a plurality of driving keys and a cam face of a plurality of bulged portions and curved teeth. The front sleeve has positioning keys and connecting clips provided in an internal wall thereof. An external wall of the front sleeve is formed with a plurality of ridges and recesses so as to facilitate manually griping of the front sleeve.

Due to the above mentioned structure of the drill chuck according to the present invention, when using the drill chuck, a driving means is engaged into an internal threaded or tapered hole defined in a rear end of the chuck body of the drill chuck, when the driving means rotate, the torque is transferred to the chuck body. When assembling, firstly, the toolholder is inserted into the apace among the three jaws within the central hole of the front end of the drill chuck. Then the rear sleeve is rotated with respect to the front sleeve.

Because the driving key of the control ring is far smaller than the driving groove of the nut jacket, before the driving key contacts with the side wall of the fastening direction of the driving groove of the nut jacket, the bulged portion of the control ring force the driving elastic element fixed at the rear end portion of the nut jacket to rotate in advance, the nut jacket and the nut driven by the driving elastic element rotate surrounding the chuck body.

As the nut is threadingly engaged with the thread of the jaws, the jaws move forwards along the angled bores so as to fasten the toolholder therebetween. When the three jaws contact with the tool holder, the friction resistance between the nut and the thread of the jaws is abruptly increased. At this time, increasing the force to rotates the rear sleeve continuously, the bulged portion of the control ring press the locking elastic element at the rear end of the nut jacket so that the locking claw engages with the ratchet teeth of the ratchet wheel. Then as the rear sleeve is continuously rotated, the claw of the locking elastic element slides and ticks along the ratchet teeth and prevents reversion until the driving key of the control ring contacts against the side wall of the fastening direction of the driving groove and fasten the toolholder between the jaws. At this time, the disk spring is deformed in maximum and contact with the shoulder of the chuck body. The elasticity of the disk spring tends to absorb the vibration and impact of the drill chuck during the operation so as to prevent the toolholder from disengagement or looseness due to the over fluctuation of the gripping force.

To release the tool holder, the front sleeve may be rotated in an opposite direction, i.e., the loose direction, with respect to the rear sleeve. As the claw of the locking elastic element is engaged with the ratchet teeth, the nut jacket is kept still with respect to the chuck body, the rear sleeve drives the control ring to rotate in an opposite direction with respect to the front sleeve and the nut jacket at first, until the driving key of the control ring contacts against the side wall of the releasing direction of the driving groove of nut jacket. As the bulged portion of the control ring releases the press applied to the locking elastic element, the locking claw is disengaged from the ratchet wheel by the resilient force of the locking elastic element. Then the rear sleeve is rotated continuously with force, the driving key of the control ring force the nut jacket and the nut rotate with respect to the chuck body and jaws. As a result, the jaws move backwards so as to release the toolholder therefrom.

In comparison with the conventional art, the present invention provides a drill chuck having a simple structure, high working stability, convenience of operation and high reliability of self-locking capability.

BRIEF ILLUSTRATION OF DRAWINGS

FIG. 1a is a schematic view of the structure of a drill chuck according to one embodiment of the present invention, FIG. 1b is an enlarged view of a portion of the drill chuck shown in FIG. 1a with a load applied, and FIG. 1c is an enlarged view of a portion of the drill chuck shown in FIG. 1a with no load applied;

PREFERRED EMBODIMENTS

Figures 2, 3:
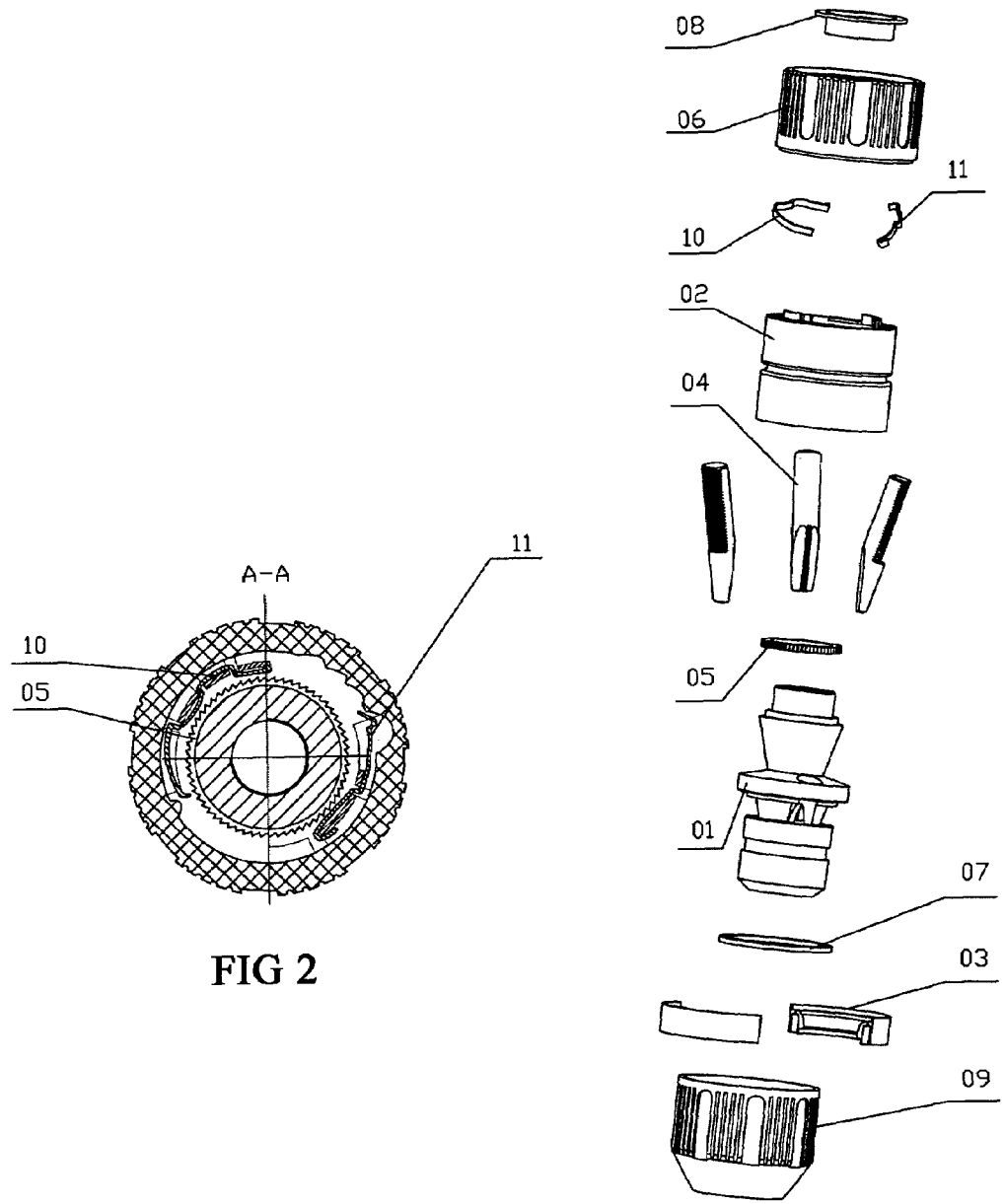
FIG. 2 is a cross sectional view along the line A—A of FIG. 1.
FIG. 3 is an exploded perspective view of the drill chuck according to the present invention.

In the following description, same reference numbers refer to the same and/or similar components with same and/or similar function or structure.

As shown in FIGS. 1a, 1b, 1c, 2, and 3, a self-locking drill chuck according to the present invention comprises a chuck body 1, a nut jacket 2, a nut 3, a plurality of (for example, three) jaws 4, a ratchet wheel 5, a rear sleeve 6, a rolling member 7, a disk spring 12, a retainer 8, a front sleeve 9, a locking elastic element 10, and a driving elastic element 11. Three jaws 4 are respectively and operatively installed in three angled bores 1-7 that are respectively defined in and uniformly distributed around the body 1. The internal threads of the nut 3 and the threads on the three jaws 4 constitute a thread drive mechanism.

The front sleeve 9 and the body 1 are fixedly connected together via a plurality of positioning keys 9-1 and connecting clips 9-2 on front sleeve 9 (see FIG. 1a) and the corresponding positioning slot 1-2 and ring type connecting groove 1-3 in a front end portion of the body 1. Therefore, it is obvious that the positioning keys 9-1 and the connecting clips 9-2 are structures corresponding to the position slot 1-2 and the ring type connecting groove 1-3 in a front end portion of the body 1 as clearly shown in FIG. 3). Moreover, as can be seen in FIG. 1a, the positioning keys 9-1 and connecting clips 9-2 on front sleeve 9 fit respectively into the positioning slot 1-2 and the ring type connecting groove 1-3 in a front end portion of the body 1. The external surface of front sleeve 9 has a plurality of ridges and recesses.

The nut jacket 2 is fixedly connected with nut 3. The disk spring 12 is provided at the step 1-1 between rolling member 7 and load-carrying shoulder 1-4 of body 1, wherein the rolling member is formed with a plurality of steel balls and the disk spring 12 is shown in FIGS. 8a–8d. It can be seen that the disk spring 12 has a surface A, surface B and surface C (see the enclosed reference FIGS. 8a–8d). When the disk spring 12 is mounted to the body 1 as shown in FIG. 1c, the surface A of the disk spring 12 lies against the step 1-1 of the body 1. Surface C contacts the rolling member 7, and surface B faces towards the load-carrying shoulder 1-4 of the body 1, and forms a gap between it and the load-carrying shoulder 1-4 of the body 1. FIG. 1b shows a clamping state of the drill chuck in which state the rolling member 7 applies a load to the disk spring 12 to deform the same towards the load-carrying shoulder 1-4 of the body 1, such that the surface B of the disk spring contacts the load-carrying shoulder 1-4. At this time, the disk spring is deformed in maximum and contact with the shoulder of the chuck body. The elasticity of the disk spring tends to absorb the vibration and impact of the drill chuck during the operation so as to prevent the toolholder from disengagement or looseness due to the over fluctuation of the gripping force. Therefore, it is obvious that when no load or not enough load is applied to the disk spring 12 to make it deformed in maximum, there is a gap G between surface B of the disk spring 12 and the load-carrying should 1-4 of the body 1. The term "minimum gap G" refers specifically to a predetermined gap between (the surface b of) the disk spring 12 and the load-carrying shoulder 1-4 of the body 1 in case that no load is applied to the disk spring 12. When the load is applied, the gap G will be decreased from the "minimum gap". In other words, when gripping force of 50 to 95 percent of a designed maximum gripping force of the drill chuck is applied, the axial deformation of the disk spring 12 will make the gap G between (the surface B of) the disk spring 12 and the load-carrying shoulder 1-4 of the body 1 disappear to zero, so as to provide a pre-tightening force to grip the toolholder. When the load is released, the gap G will appear again due to the elastic restoration of the disk spring 12. A gap G between disk spring 12 and load-carrying shoulder 1-4 (See FIGS. 1b and 1c) is determined by the deformation of the disk spring under a proximal maximum working pressure. Preferably, in accordance with one embodiment of the present invention, the minimal gap G between the disk spring and the load-carrying shoulder 1-4 under a zero working pressure is determined by the axial deformation of disk spring 12 under the axial pressure which is generated by 50 to 95 percent of the designed maximum gripping force of the self-locking drill chuck. In other words, a gripping force of 50 to 95 percent of the designed maximum gripping force of the drill chuck will result in axial deformation of the disk spring 12 so that the gap G between the disk spring 12 and the load carrying shoulder 1-4 is decreased from the minimal.

Figure 11A:
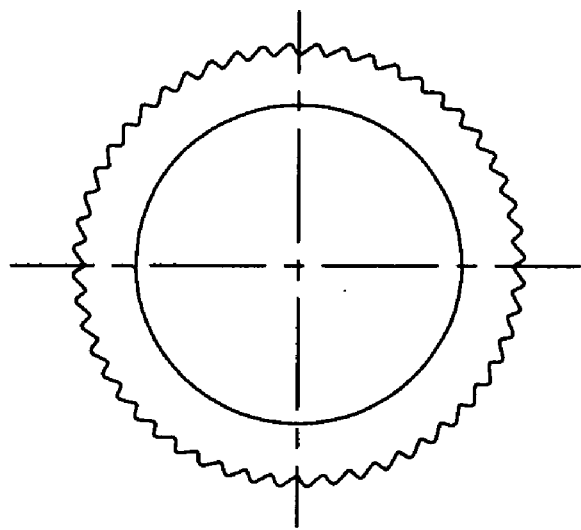
FIGS. 11a–11b show the ratchet wheel 5 of FIG. 3.
Figure 11B:
Figure 12A:
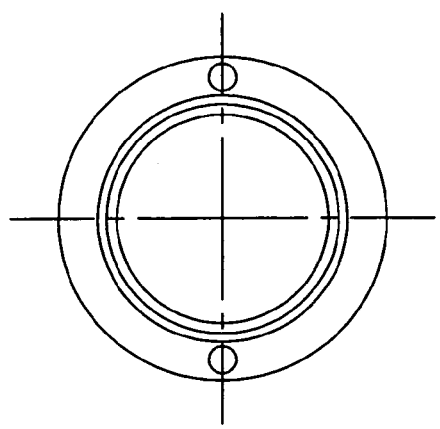
FIGS. 12a–12d show the details of the nut 3 in FIG. 3.
Figure 12D:
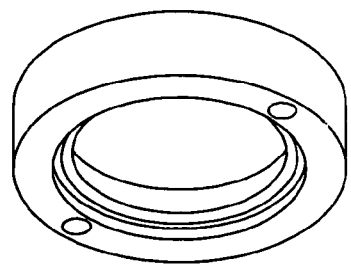
Figure 12B:
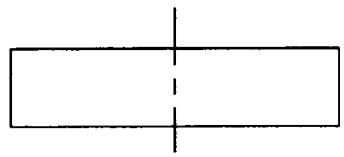
Figure 12C:
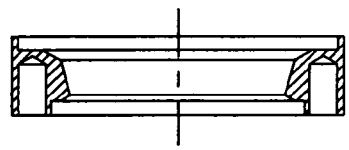
Figure 13A:
FIGS. 13a–13e show the details of the jaws 4 in FIG. 3.
Figure 13E:
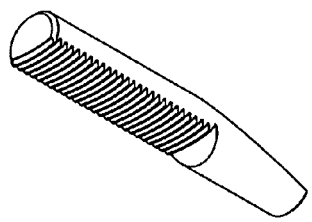
Figure 13B:
Figure 13D:
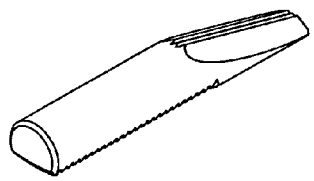
Figure 13C:

The details of body 1 are shown in FIGS. 9*a*–9*d*. A rear end portion of the nut jacket 2 has a plurality of driving grooves 2-3, keys 2-1, and keys 2-2, as shown in FIGS. 10*a*–10*d*. The locking elastic element 10 is fixed on keys 2-1, and the driving elastic element 11 is fixed on keys 2-2. The locking elastic element 10 has a locking claw 10-1 formed at one end thereof as shown in FIG. 2, and driving elastic element 11 has a claw 11-1 formed at one end thereof as shown in FIG. 3. The ratchet wheel 5 that has ratchet teeth 5-1 formed around the external surface thereof is fixedly mounted at a rear end portion 1-5 of body 1, and the details of ratchet wheel 5 are shown in FIGS. 11*a*–11*b*.

The rear sleeve 6 and the retainer 8 are sequentially installed on the rear end portion 1-5 of body 1. The retainer 8 is mounted on rear end 1-6 of body 1. The rear sleeve 6 is rotatable with respect to retainer 8. The interior of rear sleeve 6 has a plurality of driving keys 6-1 that are respectively fitted into the corresponding plurality of driving grooves 2-3 when assembling. The internal surface of rear sleeve 6 is designed as a cam face of bulged portions 6-2, a plurality of curved teeth 6-3 and transition surface, as shown in FIG. 2. The external surface of rear sleeve 6 is formed with a plurality of ridges and recesses to facilitate manually gripping of rear sleeve 6 for transmission of a larger rotational moment.

The details of the nut 3 are show in FIGS. 12*a*–12*d* and the details of the jaws 4 are shown in FIGS. 13*a*–13*e*.

Figure 9A:
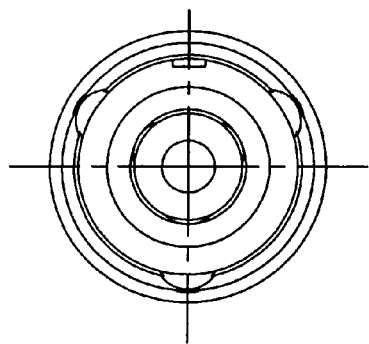
FIGS. 9a–9d show the details of the body 1 of FIG. 3.
Figure 9D:
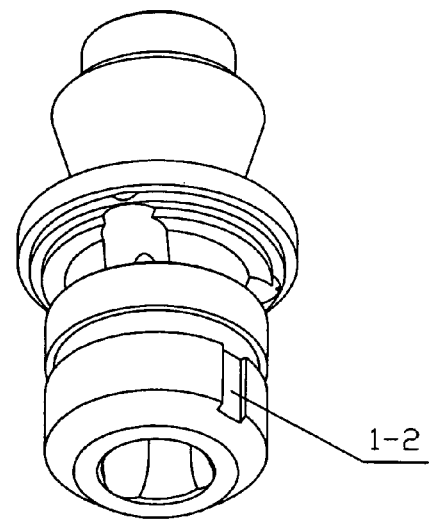
Figure 9B:
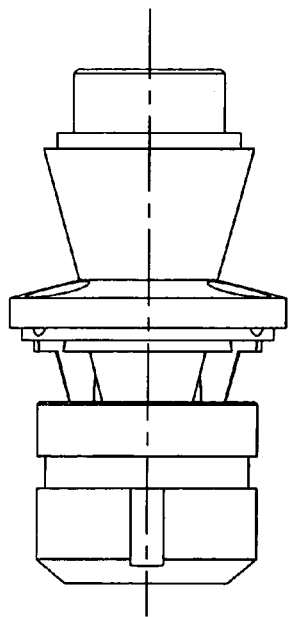
Figure 9C:
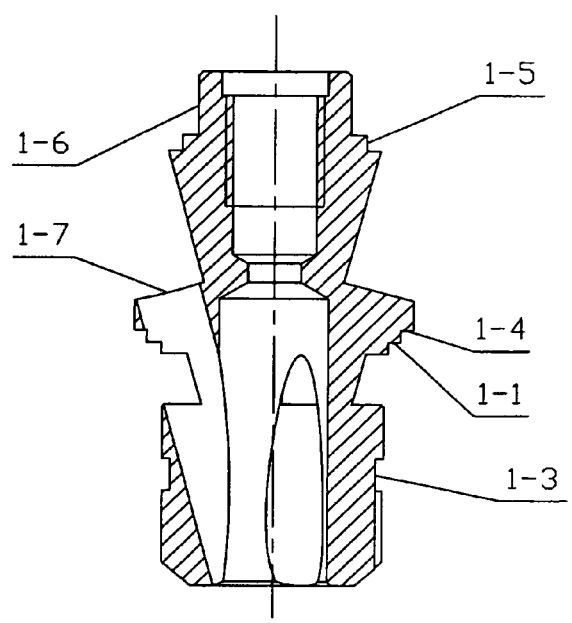
Figure 10A:
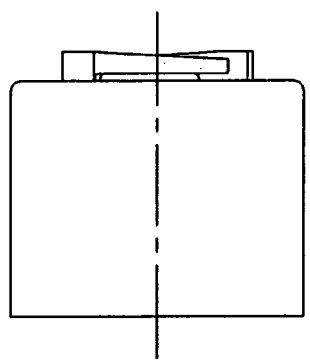
FIGS. 10a–10d show the details of the nut jacket 2 in FIG. 3.
Figure 10D:
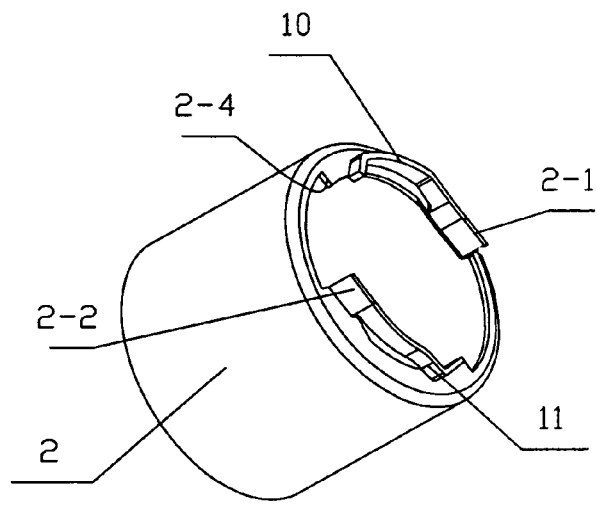
Figure 10B:
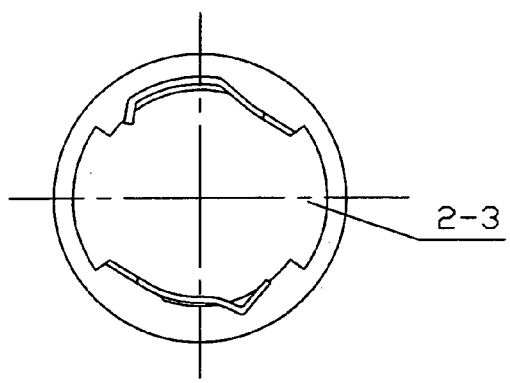
Figure 10C:
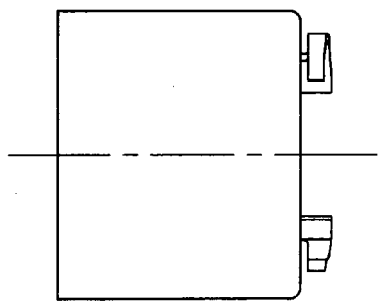

The operation of the present invention is now explained as following. A threaded rod of a driving shaft of a driving device such as a motor (not shown) and a threaded hole of the rear portion of body 1 as shown in FIG. 9*c* are fixedly coupled, and a toolholder 66 is inserted into the drill chuck and disposed among the three jaws 4 of body 1, as shown in FIG. 1, then front sleeve 9 is rotated with respect to rear sleeve 6 in the tightening direction. Because curved teeth 6-3 of the cam face inside rear sleeve 6 is engaged with claw 11-1 of the driving elastic element of nut jacket 2, driving elastic element 11 and nut jacket 2 are pushed by rear sleeve 6 to rotate with respect to body 1 and jaws 4.

The threads of nut 3 connected with nut jacket 2 and the threads of jaws 4 constitute a thread drive mechanism. The drive mechanism transforms the relative rotating movement between nut 3 and body 1 and jaws 4 into forward movement of jaws 4. The jaws 4 move along the angled bores 1-7 with respect to body 1 until jaws 4 contact against toolholder 66. When front sleeve 9 and rear sleeve 6 are rotated continuingly and relatively, as three jaws 4 press against toolholder 66 with an increasing gripping force. The resistance increases gradually, which causes claw 11-1 of driving elastic element 11 slides and ticks along curved teeth 6-3 until driving key 6-1 of rear sleeve 6 contact sidewall 2-4 (in the fastening direction) of driving groove 2-3. At this time, bulged portion 6-2 of the inner cam face of the rear sleeve presses against locking elastic element 10, and forces locking claw 10-1 to bend to engage with ratchet teeth 5-1 of ratchet wheel 5.

Meanwhile, the disk spring deforms under the axial pressure. Then, as front sleeve 9 rotates with respect to rear sleeve 6 continuingly, rear sleeve 6 rotates with respect to ratchet wheel 5, which causes locking pawl 10-1 slides and ticks along ratchet teeth 5-1 till toolholder 66 is completely fastened. The disk spring 12 is biased between shoulder 1-4 and rolling member 7 under the axial pressure till the gap between disk spring 12 and shoulder 1-4 is completely disappeared. The axial pressure applied to rolling member 7 is directly transferred to shoulder 1-4 through disk spring 12. The deformation of disk spring 12 provides elasticity to prevents toolholder 66 from loosening and releasing due to over fluctuation of the gripping force between jaws 4 and toolholder 66 under the condition of vibration and impacting.

When toolholder 66 needs to be released from the drill chuck, front sleeve 9 is rotated with respect to rear sleeve 6 in an opposite direction (i.e., the loose direction). Because bulged portion 6-2 is pressing locking elastic element 10, which leads locking claw 10-1 to engage with ratchet teeth 5-1. The nut 3 is kept from rotating with respect to ratchet wheel 5 and jaws 4. Therefore, claw 11-1 of the driving elastic element slides and ticks along curved teeth 6-3 in advance; sequentially, bulged portion 6-2 separates from the locking elastic element 10; locking claw 10-1 is disengaged from ratchet teeth 5-1 by the resilient force of locking elastic element 10, then driving key 6-1 of rear sleeve 6 moves to contact against sidewall 2-5 (in the releasing direction) of driving groove 2-3 of the nut jacket. Later, as the rear sleeve is rotated continuously, nut jacket 2 is forced by driving key 6-1 to rotate with respect to jaws 4, thereby toolholder 66 is unclamped from jaws 4.

Figure 4:
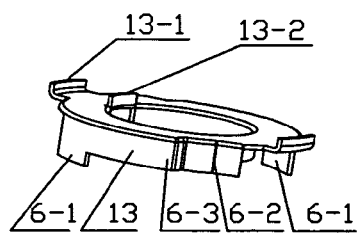
FIG. 4 is a schematic view of a control ring of another embodiment according to the present invention.
Figure 5:
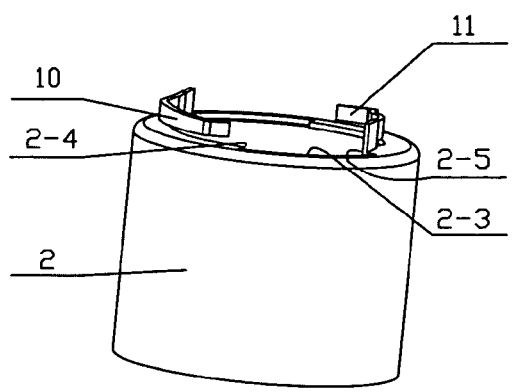
FIG. 5 is a schematic view of a nut jacket of another embodiment of the present invention, wherein the nut jacket is integrated with two elastic elements.
Figure 7:
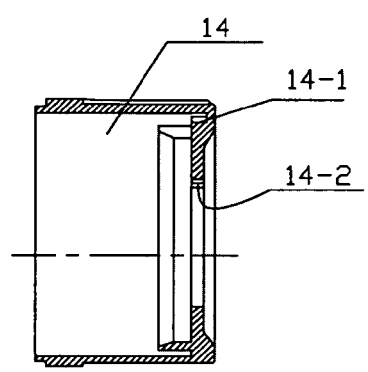
FIG. 7 is a cross sectional view along the line A—A of FIG. 6.
Figure 6:
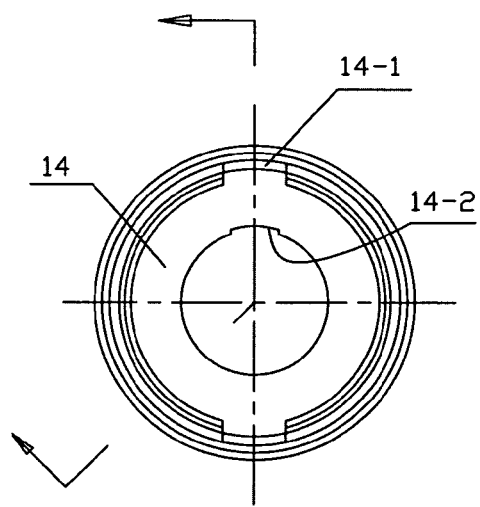
FIG. 6 is a front view of a rear sleeve being fitted with a control ring according to the other embodiment of the present invention.
Figure 8A:
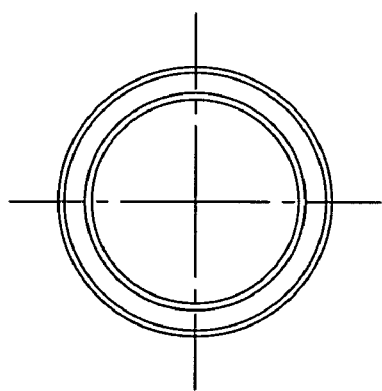
FIGS. 8a–8d show the details of the disk spring 12 of FIG. 3.
Figure 8D:
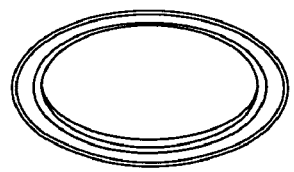
Figure 8B:
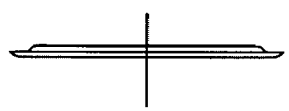
Figure 8C:
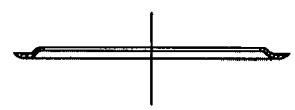

In accordance with another embodiment, locking elastic element 10, driving elastic element 11, and nut jacket 2, as shown in FIGS. 1, 2, and 3, can be replaced by an integrated nut jacket comprising nut jacket 2, locking elastic element 10 and driving elastic element 11 as shown in FIG. 5, i.e., the locking elastic element and the driving elastic element and the rear end portion of the nut jacket are integrated. The rear sleeve 6 in FIGS. 1, 2, and 3 may be replaced by assembling a control ring 13 shown in FIG. 4 and rear sleeve 14 shown in FIGS. 6 and 7, that is, control ring 13 and rear sleeve 14 are assembled. During assembling, keys 13-1 and 13-2 of control ring 13 are respectively fitted into corresponding key slots 14-1 and 14-2 of rear sleeve 14.

What is claimed is:

1. A self-locking drill chuck comprising a body, a nut, a plurality of jaws, a front sleeve, a rear sleeve, a nut jacket, and a rolling member, wherein the plurality of jaws are respectively installed in angled bores uniformly distributed around the body, the threads of the nut and the threads of the jaws installed in the angled bores of the body constitute a thread driving mechanism, and the front sleeve is fixedly connected to the body, wherein, the self-locking drill chuck further comprises:

a ratchet wheel fixedly mounted at a rear portion of the chuck body;

a disk spring arranged between the rolling member and a load carrying shoulder of the chuck body; and a plurality of positioning key slots and annular connecting groove arranged in a front end of the chuck body;

wherein a driving groove and a plurality of keys are defined at a rear end of the nut jacket and a locking elastic element and a driving elastic element are respectively mounted on the plurality of keys; a control ring is fixedly mounted on the rear sleeve and formed with a plurality of driving keys and a cam face of a plurality of bulged portions and curved teeth; and the plurality of positioning keys and connecting clips are formed in an internal surface of the front sleeve.

2. The self-locking drill chuck as recited in claim 1, wherein the locking elastic element and the driving elastic element are integrated with the rear end of the nut jacket.

3. The self-locking drill chuck as recited in claim 1, wherein the control ring is integrated with the rear sleeve.

4. The self-locking drill chuck as recited in claim 1, wherein a minimum gap between the disk spring and the load carrying shoulder of the body is determined according to the axial deformation of the disk spring under the axial pressure which is generated by 50 to 95 percent of the designed maximum gripping force of the self-locking drill chuck.

5. The self-locking drill chuck as recited in claim 1, wherein a minimum predetermined gap between the disk spring and the load carrying shoulder of the body is determined according to the axial deformation of the disk spring under the axial pressure which is generated by 50 to 95 percent of the designed maximum gripping force of the self-locking drill chuck.

6. The self-locking drill chuck as recited in claim 1, wherein a minimum gap between the disk spring and the load carrying shoulder of the body is determined according to the axial deformation of the disk spring under the axial pressure which is generated by 50 to 95 percent of the designed maximum gripping force of the self-locking drill chuck, such that the disk spring could be deformed by a load to provide elasticity to prevent a toolholder from loosening and releasing due to over fluctuation of the gripping force between the jaws and the toolholder under the condition of vibration and impacting.

* * * * *